(12) United States Patent
Kobayashi et al.

(10) Patent No.: US 6,325,740 B1
(45) Date of Patent: Dec. 4, 2001

(54) TOROIDAL-TYPE CONTINUOUSLY VARIABLE TRANSMISSION

(75) Inventors: Norihisa Kobayashi; Nobuo Goto; Kouji Ishikawa, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/617,127

(22) Filed: Jul. 14, 2000

(51) Int. Cl.[7] ................................................ F16H 15/38
(52) U.S. Cl. ................ 476/45; 476/40; 476/42; 411/283; 411/462; 411/544; 411/937.2
(58) Field of Search ................ 476/40, 42, 45; 411/283, 432, 544, 937.2

(56) References Cited

U.S. PATENT DOCUMENTS

| | | |
|---|---|---|
| 4,955,246 | 9/1990 | Nakano . |
| 4,968,289 | 11/1990 | Nakano . |
| 5,651,750 | 7/1997 | Imanishi et al. . |

FOREIGN PATENT DOCUMENTS

| | | |
|---|---|---|
| 62-71465 | 5/1987 | (JP) . |
| 1-122550 | 8/1989 | (JP) . |
| 1-234646 | 9/1989 | (JP) . |
| 1-173552 | 12/1989 | (JP) . |
| 6-37222 | 9/1994 | (JP) . |
| 7-158711 | 6/1995 | (JP) . |
| 8-21503 | 1/1996 | (JP) . |
| 8-35549 | 2/1996 | (JP) . |
| 8-61453 | 3/1996 | (JP) . |
| 10-231909 | 9/1998 | (JP) . |
| 11-257450 | 9/1999 | (JP) . |

*Primary Examiner*—David A. Bucci
*Assistant Examiner*—William C Joyce
(74) *Attorney, Agent, or Firm*—Sughrue, Mion, Zinn, Macpeak & Seas, PLLC

(57) ABSTRACT

The hardness of the outer peripheral surface of a small-diameter portion 47 and one side surface of a collar portion 52, which respectively rub against a belleville spring 39a, is set at HRc45 or higher, thereby enhancing the wear resistance of these surfaces. On the other hand, the hardness of a fastening tubular portion 51 is set at HRc30 or lower, thereby making it difficult for the fastening tubular portion 51 to be damaged or cracked when it is fastened.

6 Claims, 11 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used as a transmission for a car or as a transmission for various kinds of industrial machines.

2. Description of the Related Art

Conventionally, it has been studied that such a toroidal-type continuously variable transmission as shown schematically in FIGS. 7 and 8 is used as a transmission for a car. In this toroidal-type continuously variable transmission, for example, as disclosed in JP-A-62-71465U, an input side disk 2 is supported concentrically with an input shaft 1, while an output side disk 4 is fixed to the end portion of an output shaft 3 which is disposed concentrically with the input shaft 1. In the interior portion of a casing in which the toroidal-type continuously variable transmission is stored, there are disposed trunnions 6, 6 which are capable of swinging about their associated paired pivot shafts 5, 5 disposed at a torsional position with respect to the input and output shafts 1 and 3: specifically, the torsional position is a position which does not intersect the center axes of the input side and output side disks 2, 4 and are perpendicular to the directions of the center axes of the input side and output side disks 2, 4.

That is, in each of the trunnions 6, 6 which is disposed in the portion that is shifted from the center axes of the two disks 2, 4, on the outer surfaces of their respective two end portions, there are disposed the paired pivot shafts 5, 5 in such a manner that they extend at right angles to the directions of the center axes of the two disks 2, 4 and are concentric with each other. Also, on the middle portions of the trunnions 6, 6, there are supported the base end portions of displacement shafts 7, 7; and, the inclination angles of the displacement shafts 7, 7 can be adjusted by swinging the trunnions 6, 6 about their respective paired pivot shafts 5, 5. On the peripheries of the displacement shafts 7, 7 thus supported on the trunnions 6, 6, there are rotatably supported power rollers 8, 8. And, the power rollers 8, 8 are held by and between the mutually opposing inner surfaces 2a, 4a of the input side and output side disks 2, 4. Each of the inner surface 2a, 4a has a cross section formed as a concave surface which can be obtained when an arc having the pivot shaft 5 as the center thereof is rotated. And, the peripheral surfaces 8a, 8a of the power rollers 8, 8, which are respectively formed as spherically convex surfaces, are contacted with the inner surfaces 2a, 4a.

Between the input shaft 1 and input side disk 2, there is disposed a loading cam device 9; that is, the loading cam device 9 is capable of driving the input side disk 2 rotationally while pressing the input side disk 2 elastically toward the output side disk 4. The loading cam device 9 is composed of a loading cam 10 rotatable together with the input shaft 1, and a plurality of (for example, four) rollers 12, 12 which are rollably held by a retainer 11. On one side surface (in FIGS. 7 and 8, the right surface) of the loading cam 10, there is formed a cam surface 13 which is a curved surface extending in the circumferential direction of the loading cam 10; and, on the outer surface (in FIGS. 7 and 8, the left surface) of the input side disk 2 as well, there is formed a cam surface 14 having a similar shape to the cam surface 13. And, the plurality of rollers 12, 12 are supported in such a manner that they can be rotated about their respective axes extending in the radial direction with respect to the center of the input shaft 1.

When the above-structured toroidal-type continuously variable transmission is in use, in case where the loading cam 10 is rotated as the input shaft 1 is rotated, the cam surface 13 presses the plurality of rollers 12, 12 against the cam surface 14 formed on the outer surface of the input side disk 2. As a result of this, the input side disk 2 is pressed against the plurality of power rollers 8, 8 and, at the same time, due to the mutual pressing actions between the two cam surfaces 13, 14 and the plurality of rollers 12, 12, the input side disk 2 is rotated. And, the rotation of the input side disk 2 is transmitted through the plurality of power rollers 8, 8 to the output side disk 4, so that the output shaft 3 fixed to the output side disk 4 can be rotated.

Now, description will be given below of a case where a rotation speed ratio (transmission ratio) between the input shaft 1 and output shaft 3 is changed. At first, when reducing the rotation speed ratio between the input shaft 1 and output shaft 3, the trunnions 6, 6 may be respectively swung in a given direction about their respective paired pivot shafts 5, 5. And, the displacement shafts 7, 7 maybe inclined respectively in such a manner that the peripheral surfaces 8a, 8a of the power rollers 8, 8, as shown in FIG. 7, can be respectively contacted with the near-center portion of the inner surface 2a of the input side disk 2 and the near-outer-periphery portion of the inner surface 4a of the output side disk 4. On the other hand, when increasing the rotation speed ratio between the input shaft 1 and output shaft 3, the trunnions 6, 6 may be respectively swung in the opposite direction to the given direction about their respective paired pivot shafts 5, 5. And, the displacement shafts 7, 7 may be inclined respectively in such a manner that the peripheral surfaces 8a, 8a of the power rollers 8, 8, as shown in FIG. 8, can be respectively contacted with the near-outer-periphery portion of the inner surface 2a of the input side disk 2 and the near-center portion of the inner surface 4a of the output side disk 4. Also, in case where the inclination angles of the displacement shafts 7, 7 are set in the intermediate angles between the angles shown in FIGS. 7 and 8, there can be obtained an intermediate transmission ratio between the input and output shafts 1, 3.

Also, FIGS. 9 and 10 show an example of a more specifically structured toroidal-type continuously variable transmission which is disclosed in JP-A-1-173552U. An input side disk 2 serving as a first disk and an output side disk 4 serving as a second disk are respectively supported on the periphery of a cylinder-like input shaft 15 serving as a rotary shaft in such a manner that they can be rotated through needle roller bearings 16, 16. That is, in the respective central portions of the input side and output side disks 2, 4, there are formed through holes 17, 17 each having a circular cross section in such a manner that they respectively extend through the inside and outside surfaces of the input side and output side disks 2, 4 in the axial direction (in FIG. 9, in the right and left direction) of the disks 2, 4. The needle roller bearings 16, 16 are respectively interposed between the inner peripheral surfaces of the through holes 17, 17 and the outer peripheral surface of the middle portion of the input shaft 15. In the inner peripheral surfaces of the near-inside-surface end portions of the through holes 17, 17, there are formed securing grooves 18, 18; and, retaining rings 19, 19 are secured to the securing grooves 18, 18 respectively to thereby prevent the needle roller bearings 16, 16 from slipping out from their respective through holes 17, 17 toward the inside surfaces 2a, 4a of the input side and output side disks 2, 4. Also, the loading cam 10 is spline engaged with the outer peripheral surface of the end portion (in FIG. 9, the left end portion) of the input shaft 15; and, a flange portion 20 of the loading cam 10 prevents the thus engaged loading cam 10 from moving in a direction where it parts away from the input side disk 2. And, the loading cam 10 and rollers 12, 12 cooperate together in forming a loading cam device 9 which, based on the rotation of the input shaft 15, can rotate the input side disk 2 while pressing the input side disk 2 toward the output side disk 4. An output gear 21 is engaged with the output side disk 4 through keys 22, 22, so that the output side disk 4 and output gear 21 are allowed to rotate in synchronism with each other.

The respective two end portions of the pair of trunnions 6, 6 are supported on a pair of support plates 23, 23 in such a manner that they can be swung and also can be shifted in the axial direction (in FIG. 9, in the front and back direction; in FIG. 10, in the right and left direction). And, the displacement shafts 7, 7 are supported in circular holes 24, 24 respectively formed in the middle portions of the trunnions 6, 6. The displacement shafts 7, 7 respectively include support shaft portions 25, 25 and pivot shaft portions 26, 26 which are arranged in parallel to and eccentrically to each other. Of these shaft portions, the support shaft portions 25, 25 are rotatably supported on the interior portions of the circular holes 24, 24 through radial needle roller bearings 27, 27. Also, the power rollers 8, 8 are rotatably supported on the peripheries of the pivot shaft portions 26, 26 through another radial needle roller bearings 28, 28.

By the way, the pair of displacement shafts 7, 7 are disposed at 180° opposite positions to the input shaft 15. Also, the directions, in which the pivot shaft portions 26, 26 of the displacement shafts 7, 7 are eccentric to the support shaft portions 25, 25, are the same directions as the rotation directions (in FIG. 10, left and right opposite directions) of the input side and output side disks 2, 4. Also, the eccentric direction is set as a direction which is almost perpendicular to the mounting direction of the input shaft 15. Therefore, the power rollers 8, 8 are supported in such a manner that they can be shifted slightly along the mounting direction of the input shaft 15. As a result of this, even when, due to the elastic deformation of the component members caused by large loads applied to the component members during the transmission of the rotational force, the power rollers 8, 8 tend to shift in the axial direction of the input shaft 15 (in FIG. 9, in the left and right direction; in FIG. 10, in the front and back direction), such shift can be absorbed without applying unreasonable forces to the respective component members.

Also, the end portion of the input shaft 15 is supported on the fixed portion of the interior of the casing by a pair of ball bearings 44, 44 respectively of an angular type in such a manner that it can be rotated as well as can be shifted in the axial direction of the input shaft 15. And, a loading nut 38 is fixed to the portion of the end portion of the input shaft 15 that projects from the two ball bearings 44, 44. Between the loading nut 38 and the ball bearing 44 to which the loading nut 38 is opposed, there is interposed a belleville spring 39 which is an elastic member. The belleville spring 39 pulls the input side disk 2 elastically to the right in FIG. 9 through the input shaft 15 and loading cam device 9; and, also when the loading cam device 9 is not in operation, the belleville spring 39 has a function to secure the contact pressure between the inner surfaces 2a, 4a of the two disks 2, 4 and the peripheral surfaces 8a, 8a of the power rollers 8, 8.

Also, between the outside surfaces of the power rollers 8, 8 and the inside surfaces of the middle portions of the trunnions 6, 6, there are interposed thrust ball bearings 29, 29 and thrust needle roller bearings 30, 30 in this order starting from the outside surfaces of the power rollers 8, 8. Of these bearings, the thrust ball bearings 29, 29 are structured such that, while receiving thrust-direction loads applied to the power rollers 8, 8, they allow the rotation of the power rollers 8, 8. Also, the thrust needle roller bearings 30, 30 are structured such that, while receiving thrust loads applied to outer races 31, 31 forming the thrust ball bearings 29, 29 from the power rollers 8, 8, they allow the pivot shaft portions 26, 26 and outer races 31, 31 to oscillate about the support shaft portions 25, 25.

Further, drive rods 32, 32 are respectively connected to the respective one end portions (in FIG. 10, the left end portions) of the trunnions 6, 6, while drive pistons 33, 33 are respectively fixed to the outer peripheral surfaces of the middle portions of these drive rods 32, 32. And, the drive pistons 33, 33 are respectively fitted into drive cylinders 34, 34 in an oil-tight manner.

In the above-structured toroidal-type continuously variable transmission, the rotation of the input shaft 15 is transmitted through the loading cam device 9 to the input side disk 2. And, the rotation of the input side disk 2 is transmitted through a pair of power rollers 8, 8 to the output side disk 4 and, further, the rotation of the output side disk 4 is taken out from the output gear 21. To change a rotation speed ratio between the input shaft 15 and output gear 21, the pair of drive pistons 33, 33 may be shifted in the mutually opposite directions. With the shifting movements of the pistons 33, 33, the pair of trunnions 6, 6 are shifted in the mutually opposite directions; for example, the power roller 8 situated on the lower side in FIG. 10 is shifted to the right in FIG. 10, while the power roller 8 on the upper side in FIG. 10 is shifted to the left in FIG. 10. This changes the direction of tangential-direction forces acting on the contact portions between the peripheral surfaces 8a, 8a of the power rollers 8, 8 and the inner surfaces 2a, 4a of the input side and output side disks 2, 4. With the change in the tangential-direction force direction, the trunnions 6, 6 are caused to swing in the mutually opposite directions about the pivot shafts 5, 5 pivotally supported on the support plates 23, 23. As a result of this, as shown in FIGS. 7 and 8 which have been discussed before, the contact positions between the peripheral surfaces 8a, 8a of the power rollers 8, 8 and the inner surfaces 2a, 4a of the input side and output side disks 2, 4 are caused to change, thereby changing the rotation speed ratio between the input shaft 15 and output gear 21.

By the way, when carrying out the transmission of the rotation force between the input shaft 15 and output gear 21 in this manner, due to the elastic deformation of the component members, the power rollers 8, 8a reshifted in the axial direction of the input shaft 15, so that the displacement shafts 7, 7 pivotally supporting the power rollers 8, 8 are slightly rotated about their respective support shaft portions 25, 25. As a result of this slight rotation, the outside surfaces of the outer races 31, 31 of the thrust ball bearings 29, 29 and the inside surfaces of the trunnions 6, 6 are shifted with respect to each other. Because the thrust needle roller bearings 30, 30 are interposed between these outside surfaces and inside surfaces, such relative shifting motion can be achieved with a small force. Therefore, the inclination angles of the displacement shafts 7, 7 can be changed in the above-mentioned manner with a small force.

Further, conventionally, as disclosed in JP-A-1-234646, JP-A-7-158711, JP-A-8-21503, and JP-A-8-35549, there is also known a so called double cavity type structure in which, in order to increase the torque that can be transmitted, as shown in FIGS. 11 and 12, on the periphery of an input shaft 15*a*, there are disposed two input side disks 2A, 2B and two output side disks 4, 4, while these two input side disks 2A, 2B and two output side disks 4, 4 are arranged in parallel to each other with respect to the power transmission direction. In the structure shown in FIGS. 11 and 12, on the periphery of the middle portion of the input shaft 15*a*, there is supported an output gear 21*a* in such a manner that it can be rotated with respect to the input shaft 15*a*, while the two output side disks 4, 4 are respectively spline engaged with the two end portions of a cylindrical-shaped sleeve 35 disposed on the central portion of the output gear 21*a*. And, between the inner peripheral surfaces of through holes 17, 17 formed in the two output side disks 4, 4 and the outer peripheral surface of the input shaft 15*a*, there are interposed needle roller bearings 16, 16, whereby the two output side disks 4, 4 are respectively supported on the periphery of the input shaft 15*a* in such a manner that they can be rotated with respect to the input shaft 15*a* as well as can be shifted in the axial direction of the input shaft 15*a*. Also, the two input side disks 2A, 2B are respectively supported on the two end portions of the input shaft 15*a* in such a manner that they can be rotated together with the input shaft 15*a*. The input shaft 15*a* can be driven, that is, rotated by a drive shaft 36 through a loading cam device 9. By the way, between the outer peripheral surface of the leading end portion (in FIGS. 11 and 12, the right end portion) of the drive shaft 36 and the inner peripheral surface of the base end portion (in FIGS. 11 and 12, the left end portion) of the input shaft 15*a*, there is interposed a radial bearing 37 such as a sliding bearing or a needle roller bearing. Therefore, the drive shaft 36 and input shaft 15*a* are combined together in such a manner that they can be slightly shifted in the rotation direction thereof while they are still left arranged concentric with each other.

However, one input side disk 2A (in FIGS. 11 and 12, the input side disk that is situated on the right side) is disposed such that its back surface (in FIGS. 11 and 12, its right side surface) is butted against a loading nut 38*a* through a belleville spring 39*a* having large elasticity, thereby substantially preventing the one input side disk 2A from shifting in its axial direction (in FIGS. 11 and 12, in the right and left direction) with respect to the input shaft 15*a*. On the other hand, the other input side disk 2B, which is disposed opposed to a loading cam 10, is supported on the input shaft 15*a* by a ball spline 40 in such a manner that it can be shifted in the axial direction thereof. And, between the outside surface (in FIGS. 11 and 12, the left side surface) of the input side disk 2B and a securing stepped portion 41 formed on the outer periphery of the middle portion of the input shaft 15*a*, there is interposed a belleville spring 42 which serves as a pre-load spring. The belleville spring 42 has elasticity smaller than that of the belleville spring 39 and applied pre-loads to the contact portions between the inner surfaces 2*a*, 4*a* of the disks 2A, 2B and the peripheral surfaces 8*a*, 8*a* of the power rollers 8, 8. That is, when the loading cam device 9 does not generate thrust or when it generates only small thrust, the belleville spring 42 secures the contact pressures of the contact portions to thereby allow the toroidal-type continuously variable transmission to transmit small torque as well.

Also, the output gear 21*a* is rotatably supported on a partition wall 43 formed in the interior portion of a housing in such a manner that it is prevented from shifting in the axial direction thereof by a pair of ball bearings 44*a*, 44*a* each of an angular type. By the way, in the toroidal-type continuously variable transmission of a double cavity type shown in FIGS. 11 and 12, as described above, one or both of the input side disks 2A, 2B disposed opposed to the loading cam 10 are supported on the input shaft 15*a* by the ball splines 40, 40 in such a manner that they can be shifted in the axial direction thereof. The reason for this is to allow the two disks 2A, 2B to shift in the axial direction thereof with respect to the input shaft 15*a* due to the elastic deformation of the component members caused by the operation of the loading cam device 9 while rotating the two disks 2A, 2B in synchronism with each other. Also, the reason why the back surface of one input side disk 2A is butted against the loading nut 38*a* through the belleville spring 39 having large elasticity is to absorb a thrust-direction shock load applied to one input side disk 2A when the torque transmitted through the toroidal-type continuously variable transmission increases suddenly.

When the above-mentioned toroidal-type continuously variable transmission of a double cavity type is in operation, the rotation of the drive shaft 36 is transmitted through the loading cam device 9 to the other input side disk 2B (in FIGS. 11 and 12, situated in the left side) and, further, the rotation of the input side disk 2B is transmitted through the input shaft 15*a* to one input side disk 2A, so that the two input side disks 2A, 2B can be rotated in synchronism with each other. And, the rotational movements of the two input side disks 2A, 2B are respectively transmitted to the pair of output disks 4, 4 through a plurality of power rollers 8, 8 for each disk (in the illustrated structure, two power rollers for each disk, that is, four power rollers in total). As a result of this, the sleeve 35, whose two end portions are spline engaged with the two output side disks 4, 4, is rotated to thereby rotate the output gear 21*a* fixed to the outer peripheral surface of the middle portion of the sleeve 35. As described above, in the toroidal-type continuously variable transmission of a double cavity type, since the transmission of the rotation from the drive shaft 36 to the output gear 21*a* is carried out through two systems arranged parallel to each other, large torque transmission is possible. Also, by changing the inclination angles of the power rollers 8, 8 held by and between the disks 2A, 2B and 4, 4 in synchronism with each other, a transmission ratio between the two input side disks 2A, 2B and the two output side disks 4, 4 can be changed.

In the conventional toroidal-type continuously variable transmission which is structured and operates in the above-mentioned manner, sufficient consideration is not always given to the durability of the loading nut 38 or 38*a* which is to be threadedly engaged with and fixed to the input shaft 15 or 15*a* serving as a rotary shaft. That is, of the conventional structures, in the structure shown in FIG. 9, the belleville spring 39, which is disposed adjacent to the loading nut 38, is elastically deformed according to the operating state of the loading cam device 9 (according to the intensity of a thrust load generated), with the result that part of the belleville spring 39 and the axial-direction one surface (in FIG. 9, the left side surface) of the loading nut 38 are caused to rub against each other. Also, in the structure shown in FIGS. 11 and 12 as well, although not so much as in the structure shown in FIG. 9, the belleville spring 39*a* is elastically deformed according to the operating state of the loading cam device 9, with the result that part of the belleville spring 39*a* and the axial-direction one surface (in FIGS. 11 and 12, the left side surface) of the loading nut 38*a* rub together.

In order to prevent the loading nut 38 or 38*a* from being worn heavily in spite of the fact that it rubs against the belleville spring 39 or 39*a*, it is necessary to enhance (harden) the hardness of the loading nut 38 or 38*a*. On the other hand, in order to prevent the loading nut 38 or 38*a* threadedly engaged with the input shaft 15 or 15*a* from shifting from its given position, it is necessary that, after the loading nut 38 or 38a is threadedly engaged with the given portion of the input shaft 15 or 15a, apart of the loading nut 38 or 38a is fastened inwardly in the diameter direction thereof to thereby prevent the loosening of the loading nut 38 or 38a. To fasten part of the loading nut 38 or 38a inwardly in the diameter direction thereof, it is necessary that the hardness of the load nut 38 or 38a is lowered (softened) to thereby prevent occurrence of damage such as a crack in the loading nut 38 or 38a which could be otherwise caused by the fastening operation.

However, in the conventional toroidal-type continuously variable transmission, due consideration is not given to fulfillment of such two contrary requirements, that is, wear prevention and damage prevention in the fastening operation.

SUMMARY OF THE INVENTION

The present invention aims at eliminating the drawbacks found in the conventional toroidal-type continuously variable transmissions. Accordingly, it is an object of the invention to provide a toroidal-type continuously variable transmission which can realize not only the wear prevention of a loading nut but also the damage prevention of a fastening tubular portion used to prevent loosening of the loading nut.

In attaining the above object, according to a first object of the invention, there is provided a toroidal-type continuously variable transmission, including: a rotary shaft; first and second disks respectively rotatably supported on the periphery of the rotary shaft, the first and second disks respectively having inner peripheral surfaces of the first and second disks which are disposed opposed to each other, the inner peripheral surfaces respectively having a cross section formed in an arc-shaped concave surface; a plurality of trunnions swingable about pivot shafts disposed at torsional positions with respect to the center axes of the first and second disks; a plurality of displacement shafts respectively disposed on the trunnions; a plurality of power rollers respectively held between the first and second disks while being rotatably supported on the peripheries of the displacement shafts, each of the peripheries of the power rollers being formed in a spherically-shaped convex surface; a loading nut threadedly fixed to a part of the rotary shaft; and, a metal elastic member having one side thereof supported by the loading nut to apply an elastic force in a direction where the first and second disks approach each other, wherein the loading nut has one end face opposed to the elastic member and includes a fastening deformable portion formed in the other end face thereof, the hardness of the one end face opposed to the elastic member is set at HRc45 or higher, and the hardness of the fastening deformable portion is set at HRc30 or lower.

According to a second aspect of the invention, in a toroidal-type continuously variable transmission according to the first aspect of the invention, a plurality of recessed grooves for supply of lubricating oil is formed in a portion of the loading nut fitting with the elastic member.

According to a third aspect of the invention, in a toroidal-type continuously variable transmission according to the first aspect of the invention, the loading nut includes a small-diameter portion with the outer surface of which the elastic member can be fitted, and a collar portion against which the axial-direction one end portion of the elastic member can be butted.

According to a fourth aspect of the invention, in a toroidal-type continuously variable transmission according to the first aspect of the invention, the loading nut is disposed on the outside surface side of the first disk.

According to a fifth aspect of the invention, in a toroidal-type continuously variable transmission according to the first aspect of the invention, there is further included a loading cam device interposed between the rotary shaft and the first disk, for pressing the first disk toward the second disk elastically, and the loading nut is disposed on the opposite side to the first disk with respect to the loading cam device.

According to a sixth aspect of the invention, in a toroidal-type continuously variable transmission according to the first aspect of the invention, there is further included a loading cam device interposed between the rotary shaft and the first disk, for pressing the first disk toward the second disk elastically, and the loading nut is disposed on the second disk side as well as on the opposite side to the loading cam device with respect to the power rollers.

An operation for power transmission between the first and second disks and an operation for change of a rotation speed ratio between the first and second disks, which are respectively executed by the above-structured toroidal-type continuously variable transmission according to the invention, are similar to the operations to be executed by the previously-described conventional toroidal-type continuously variable transmission.

Especially, in the case of the toroidal-type continuously variable transmission according to the invention, of the axial-direction two end faces of the loading nut, one end face opposed to the metal-made elastic member is formed so as to have high hardness of HRc45 or higher and, therefore, in spite of the fact that the elastic member and loading nut are caused to rub against each other due to the elastic deformation of the elastic member, the loading nut can be prevented from being worn.

Further, since the fastening deformable portion formed in the other end face of the loading nut is set so as to have low hardness of HRc30 or lower, when part of the loading nut is fastened to part of the outer peripheral surface of the rotary shaft so as to prevent the shifting motion of the loading nut, occurrence of damage such as a crack in the loading nut can be prevented.

DETAILED DESCRIPTION OF THE PREFERRED EMBODIMENTS

Figure 1:
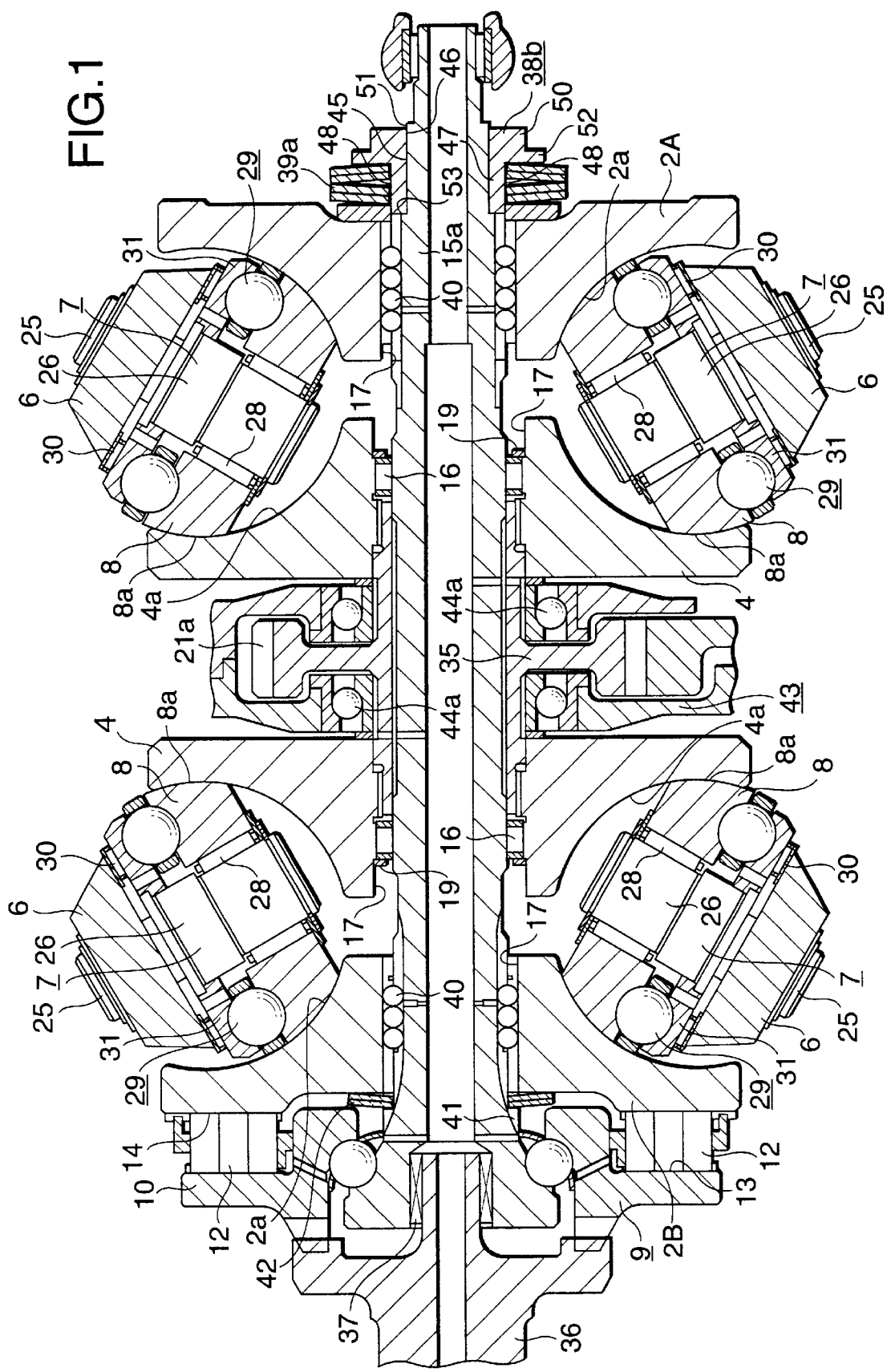
FIG. 1 is a section view of a first embodiment according to a mode for carrying out the invention.
Figure 2:
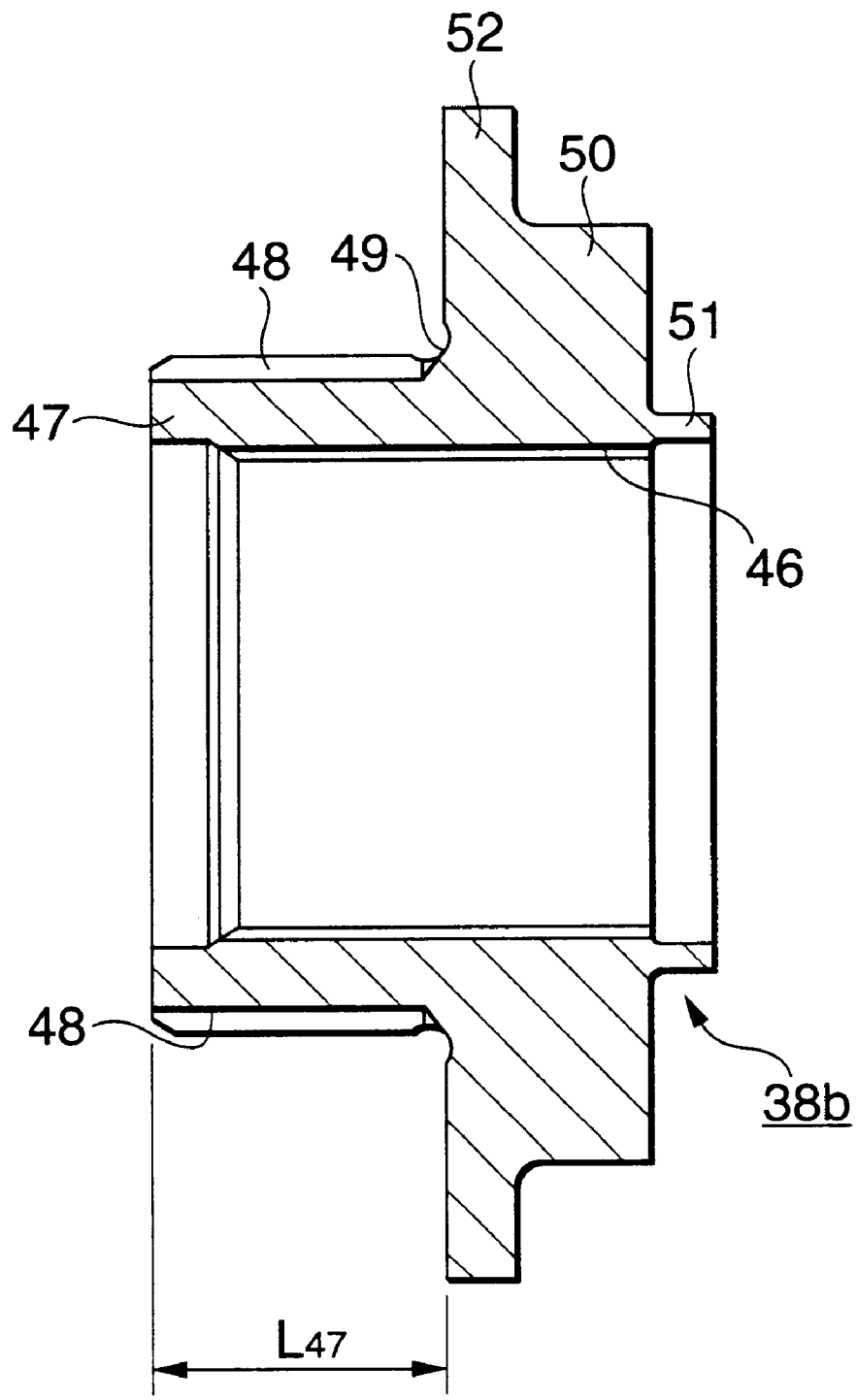
FIG. 2 is an enlarged section view of a loading nut used in the first embodiment.
Figure 11:
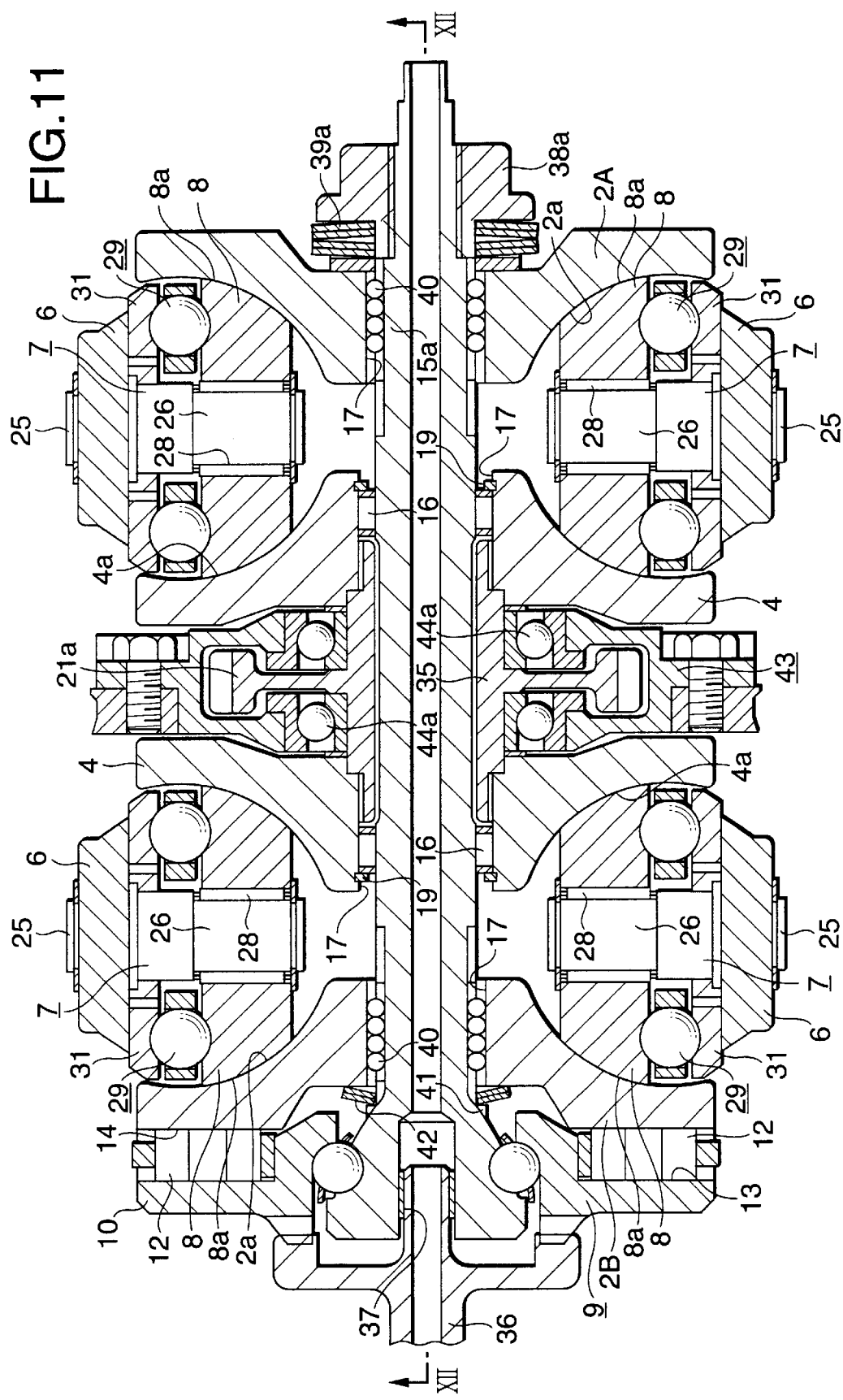
FIG. 11 is a section view of a second example of a conventional toroidal-type continuously variable transmission; and, FIG. 12 is a section view taken along the line XII—XII shown in FIG. 11.
Figure 12:
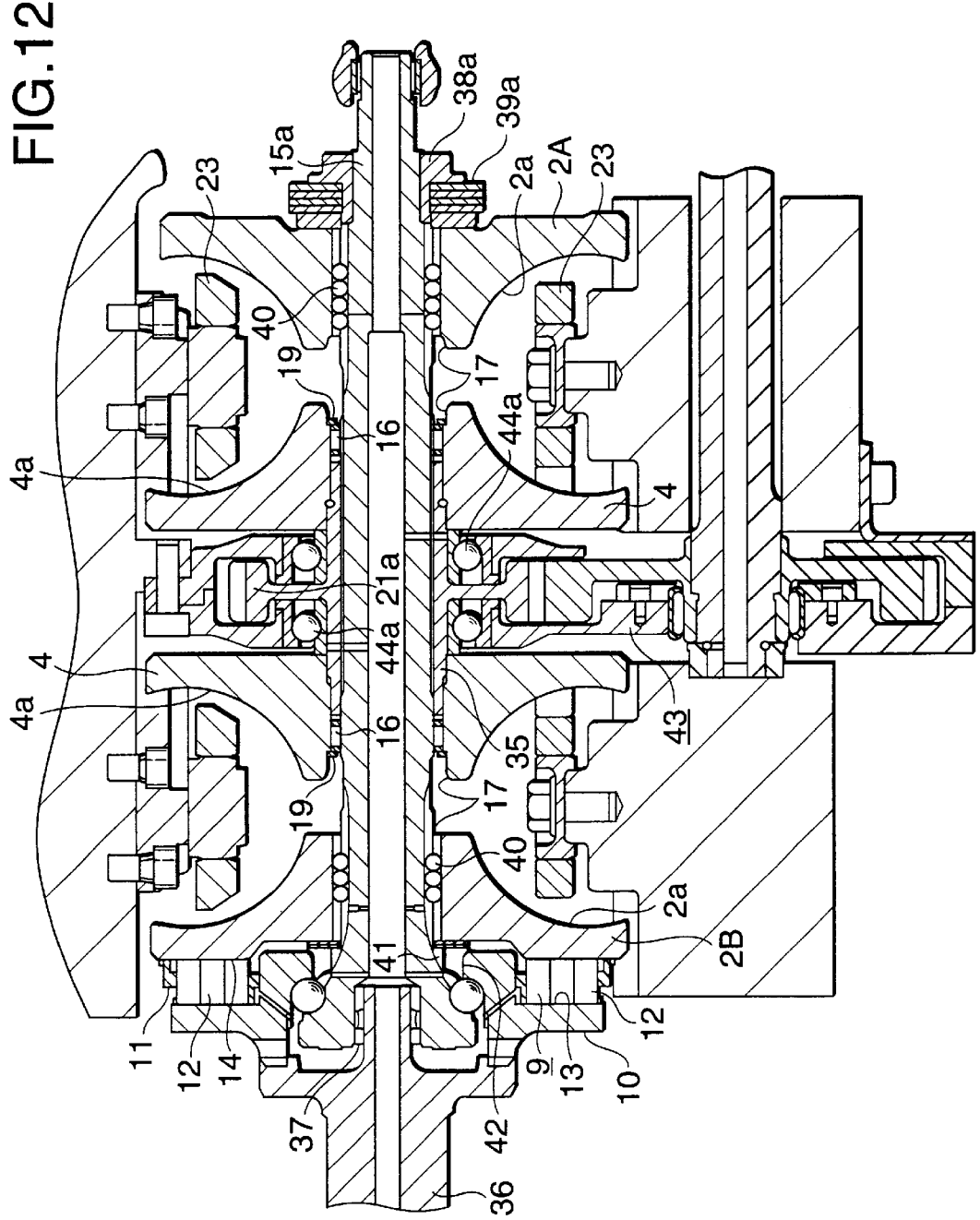

Now, FIGS. 1 and 2 show a first embodiment of a mode for carrying out the invention. By the way, a main feature of the present embodiment is a loading nut 38b for supporting one side (in FIG. 1, the right side) of a belleville spring 39a which is used to support one input side disk 2A (an input side disk shown on the right side in FIG. 1) serving as a first disk on an input shaft 15a in a shock absorbing manner. Since the structures and operations of the remaining portions of the present embodiment are similar to the conventional structure previously shown in FIGS. 11 and 12, the equivalent portions thereof are given the same designations and thus the duplicate description thereof is omitted or simplified here. Therefore, description will be given below mainly of the loading nut 38b.

The loading nut 38b is formed of carbon steel into an integrated body. In the central portion of the loading nut 38b, there is formed a screw hole 46 which can be threadedly engaged with a male screw portion 45 formed in the input shaft 15a. Also, of the outer peripheral surface of the loading nut 38b, one half section thereof, which provides the outside surface (in FIG. 1, the right side surface) side (in FIGS. 1 and 2, the left side of the loading nut 38b) of the input side disk 2A in a state where the toroidal-type continuously variable transmission is assembled, is formed as a small-diameter portion 47 which can be fitted with the belleville spring 39a. In the two or more circumferential-direction portions of the outer peripheral surface of the small-diameter portion 47, there are formed recessed grooves 48, 48 which extend in the axial direction of the loading nut 38b and are used to supply lubricating oil (traction oil) to the fitted portion of the belleville spring 39a.

Also, in the middle portion of the outer peripheral surface of the loading nut 38b in the axial direction thereof (in FIGS. 1 and 2, in the right and left direction), there is formed a collar portion 52 against which the axial-direction one end portion (in FIGS. 1 and 2, the right end portion) of the belleville spring 39a can be butted. The inner peripheral edge portion of the collar portion 52 and the base end portion (in FIGS. 1 and 2, the right end portion) of the small-diameter portion 47 are allowed to be smoothly continuous with each other by a curved surface portion 49 whose cross section has a relatively large radius of curvature. Due to formation of such curved surface portion 49, when the toroidal-type continuously variable transmission is in operation, in spite of a large thrust load applied to the collar portion 52, there can be relieved stress which is applied to the continuously connected portion between the inner peripheral edge portion of the collar portion 52 and the base end portion of the small-diameter portion 47, to thereby prevent occurrence of damage such as a crack in the continuously connected portion.

Also, the other half section (in FIGS. 1 and 2, the right half section) of the outer peripheral surface of the loading nut 38b is formed as an engaging portion 50. On the outer peripheral surface of the engaging portion 50, there are formed a pair of mutually parallel flat surfaces, or the present outer peripheral surface is formed in a hexagonal shape, whereby a tool such as spanner can be engaged with the engaging portion 50.

Further, on the end face of the engaging portion 50, there is projectingly formed a fastening tubular portion 51 having a thickness of the order of 0.5–1 mm, which serves as a fastening deformable portion of the present invention. The inside diameter of the fastening tubular portion 51 is set slightly larger than the inside diameter (root diameter) of the screw hole 46 and, on the inner peripheral surface of the fastening tubular portion 51, there is not formed a female screw.

Especially, in the present embodiment, of the respective portions of the loading nut 38b, the outer peripheral surface portion of the small-diameter portion 47, one end face (in FIGS. 1 and 2, the left end face) of the collar portion 52 which continues from this outer peripheral surface portion and is one end face opposed to the belleville spring 39a, and the end face (in FIGS. 1 and 2, the left end face) on the small-diameter portion 47 side are respectively formed so as to have hardness of HRc45 or higher (preferably, HRc50 or higher). On the other hand, the hardness of the fastening tubular portion 51 formed on the other end face and serving as the fastening deformable portion is set at HRc30 or lower (preferably, HRc25 or lower). Further, the hardness of the other remaining portions is set in the range of HRc25–HRc45.

The loading nut 38b is threadedly engaged with the male screw portion 45 formed in the input shaft 15a and also the fastening tubular portion 51 is fastened (that is, deformed plastically) inwardly in the diameter direction thereof, thereby being able to prevent the loading nut 38b from loosening with respect to the male screw portion 45. That is, the loading nut 38b is tightened on until, of the axial-direction two end portions of the loading nut 38b, the end face on the small-diameter portion 47 side is butted against a stepped portion 53 formed on the outer peripheral surface of the middle portion of the input shaft 15a. With this tightening of the loading nut 38b, a large load is applied to the above-mentioned end face but, since the hardness of the present end face is set at HRc50 or higher, the present end face can be hardly deformed plastically. In this manner, in a state where the loading nut 38b is threadedly engaged with and fixed to the input shaft 15a, a predetermined elasticity is applied to the belleville spring 39a which is held by and between the loading nut 38b and input side disk 2A. By the way, in order to regulate the intensity of this elasticity to a specified level, the small-diameter portion 47 must be finished with high precision in such a manner that it can have a specified axial-direction length $L_{47}$.

In the case of the present toroidal-type continuously variable transmission incorporating the loading nut 38b therein, not only wear prevention of the loading nut 38b but also prevention of occurrence of damage such as a crack in the loading nut 38b can be realized. That is, because, of the respective portions of the loading nut 38b, the outer peripheral surface portion of the small-diameter portion 47 and one end face of the collar portion 52, which are disposed opposed to the belleville spring 39a and rub against part of the belleville spring 39a, are respectively formed so as to have hardness of HRc50 or higher, wear prevention of the loading nut 38b can be achieved in spite of the fact that the belleville spring 39a and loading nut 38b are caused to rub together due to the elastic deformation of the belleville spring 39a.

Also, since the hardness of the fastening tubular portion 51 is set small, that is, at HRc25 or lower, when the fastening tubular portion 51 is fastened to a part of the outer peripheral surface of the rotary shaft 15a in order to prevent the loading nut 38b against shifting motion, the occurrence of damage such as a crack in the loading nut 38b can be prevented.

Further, because the hardness of the remaining portions is set in the range of HRc25–HRc45, not only the fatigue fracture strength of the other remaining portions can be secured sufficiently but also occurrence of delayed fracture of the other remaining portions can be prevented.

By the way, the loading nut 38b, the respective portions of which are different in hardness from one another, can be manufactured according to any one of the following methods (1) to (3).

(1) The material of carbon steel forming the loading nut 38b is regulated to thereby set the hardness of the whole loading nut 38b in the range of HRc25–HRc45. The outer peripheral surface and end face portions of the small-diameter portions 47 as well as one end face of the collar portion 52 are respectively induction-hardened to thereby set the hardness of these portions at HRc50 or higher. On the other hand, the fastening tubular portion 51 is induction-annealed to thereby set the hardness of the fastening tubular portion 51 at HRc25 or lower.

(2) In a state where an anti-carbonization treatment is enforced on the fastening tubular portion 51 and the inner peripheral surface of the screw hole 46, the whole surface of the loading nut 38b is carburized and hardened.

(3) The material of carbon steel forming the loading nut 38b is regulated to thereby set the hardness of the whole loading nut 38b at HRc30 or lower. The outer peripheral surface and end face portions of the small-diameter portions 47 as well as one end face of the collar portion 52 are respectively induction hardened to thereby set the hardness of these portions at HRc45 or higher.

Further, instead of the above methods (1) to (3), there can also be employed the following method (4).

(4) Instead of securing the hardness of the outer peripheral surface and end face portions of the small-diameter portions 47 as well as one end face of the collar portion 52 (that is, without increasing the hardness of these respective surfaces specially), a surface treatment for wear resistant is enforced on these respective surfaces.

Figure 3:
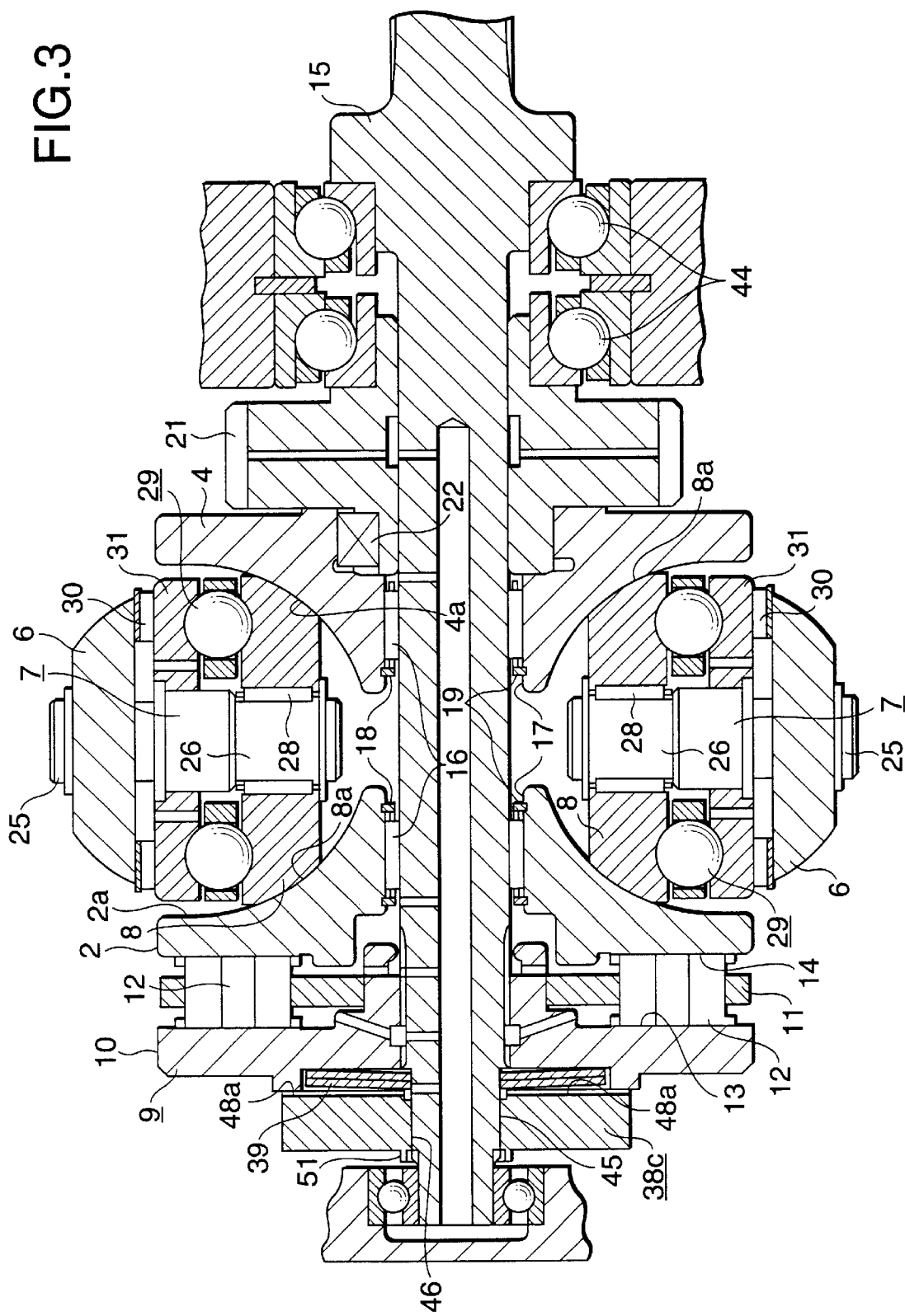
FIG. 3 is a section view of a second embodiment according to a mode for carrying out the invention.
Figure 4:
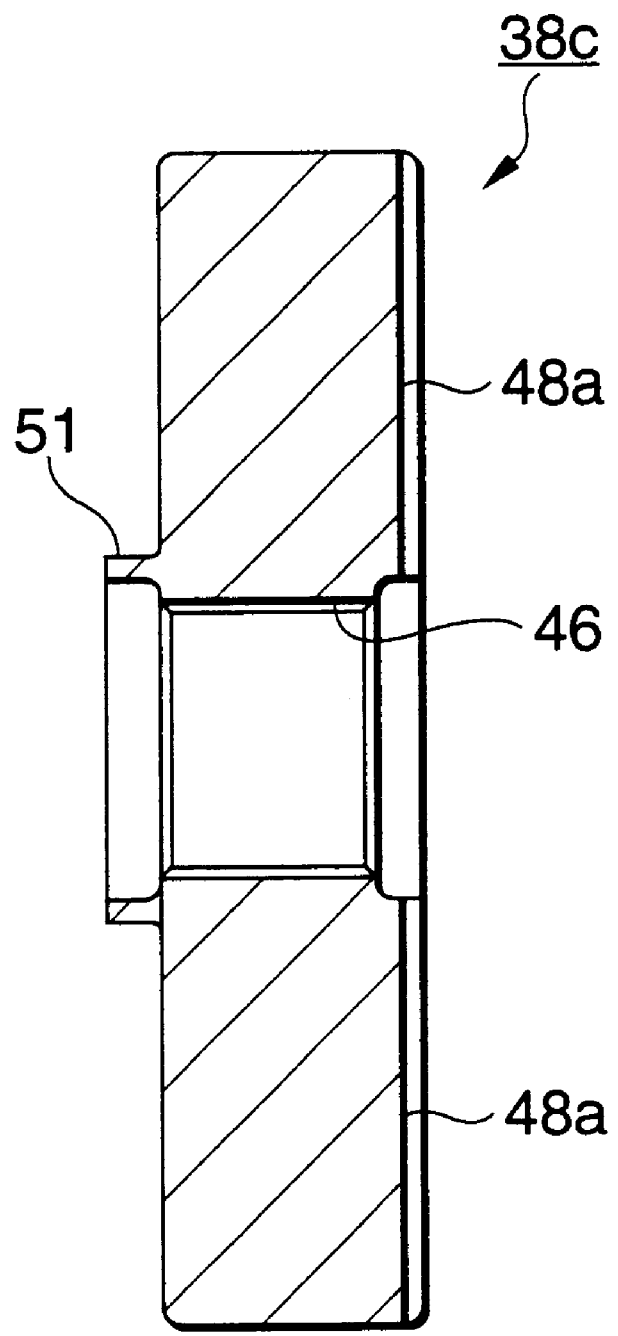
FIG. 4 is an enlarged section view of a loading nut used in the second embodiment.

Next, FIGS. 3 and 4 show a second embodiment according to the mode for carrying out the invention. In the present embodiment, the present invention is applied to a so called single cavity type of toroidal-type continuously variable transmission in which there are disposed an input side disk 2 and an output side disk 4. In the present embodiment, a loading nut 38c is disposed on the opposite side to the input side disk 2 with respect to a loading cam device 9. Also, the loading nut 38c is formed in a ring shape as a whole. And, in the surface of the loading nut 38c that is disposed opposed to a loading cam 10, there are formed a plurality of recessed grooves 48a, 48a in a radial direction of the loading nut 38c, which are used to let lubricating oil flow therethrough. On the other hand, in the near-inner-periphery portion of the surface of the loading nut 38c that is situated on the opposite side of the loading cam 10, there is formed a fastening tubular portion 51 serving as a fastening deformable portion which is used to prevent the loading nut 38c from loosening. And, the hardness of the surface portion of the end face where the recessed grooves 48a, 48a are formed is preferably set at HRc45 or higher (more preferably, HRc50 or higher). On the other hand, the hardness of the fastening tubular portion 51 is preferably set at HRc30 or lower (more preferably, HRc25 or lower).

In the case of the structure employed in the present embodiment as well, not only wear prevention of the loading nut 38c but also prevention of occurrence of damage such as a crack in the loading nut 38c can be realized.

Figure 9:
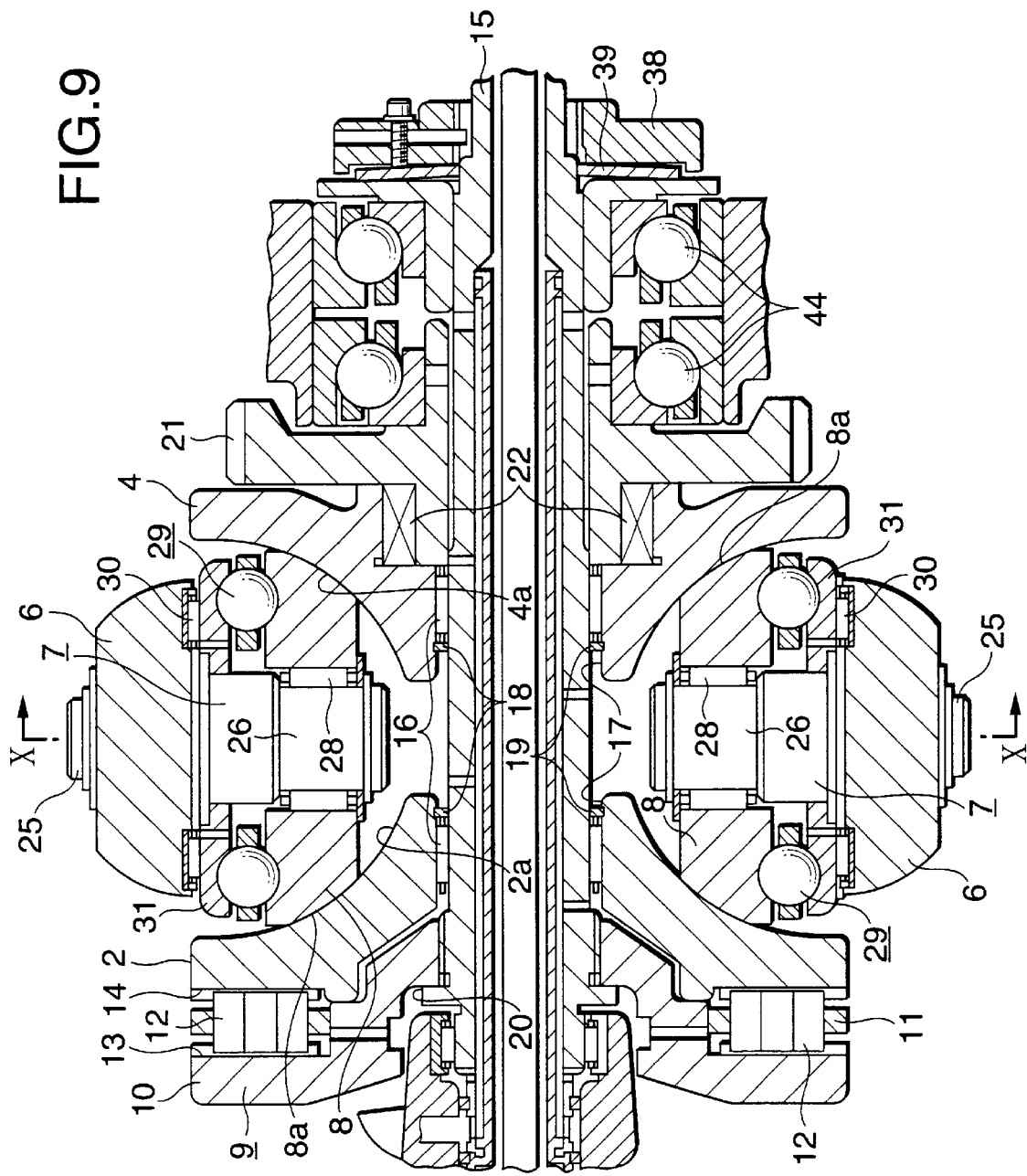
FIG. 9 is a section view of a first example of a conventional toroidal-type continuously variable transmission.
Figure 10:
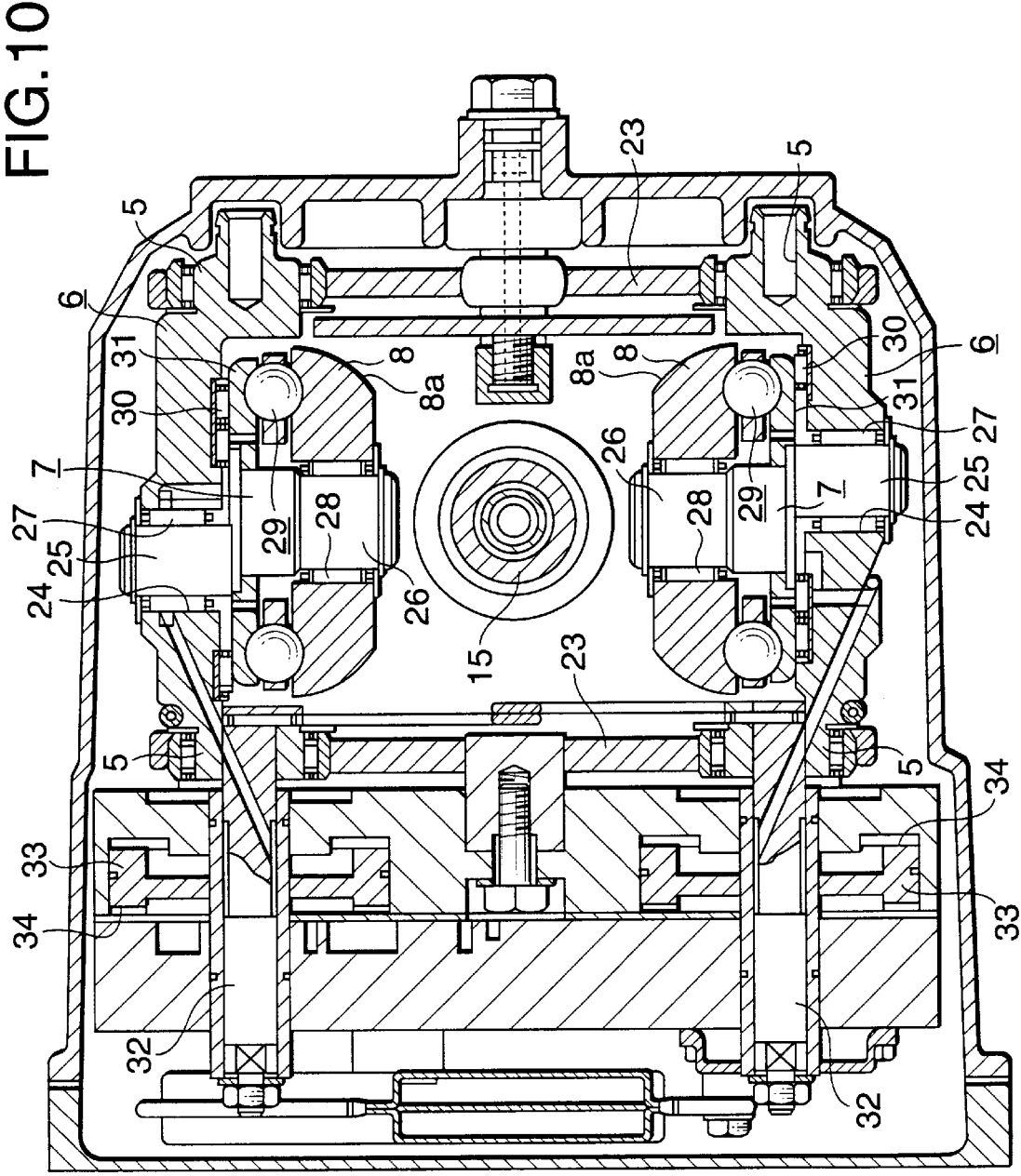
FIG. 10 is a section view taken along the line X—X shown in FIG. 9.

The remaining structures and operations of the present embodiment are similar to the previously described conventional structure shown in FIGS. 9 and 10 and the previously described first embodiment according to the mode for carrying out the invention. Therefore, the equivalent portions thereof are given the same designations and thus the duplicate description thereof is omitted here.

Figure 5:
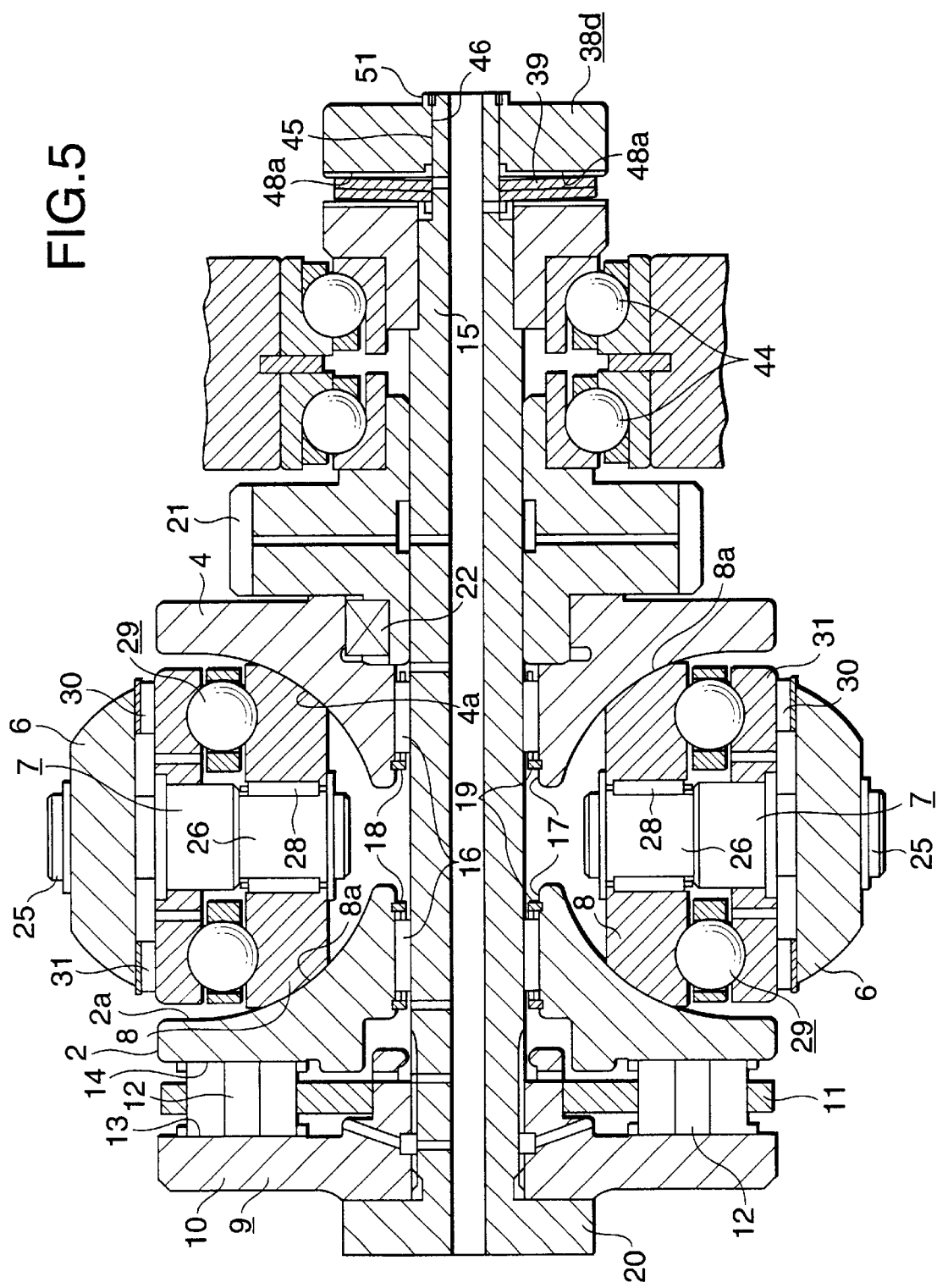
FIG. 5 is a section view of a third embodiment according to a mode for carrying out the invention.
Figure 6:
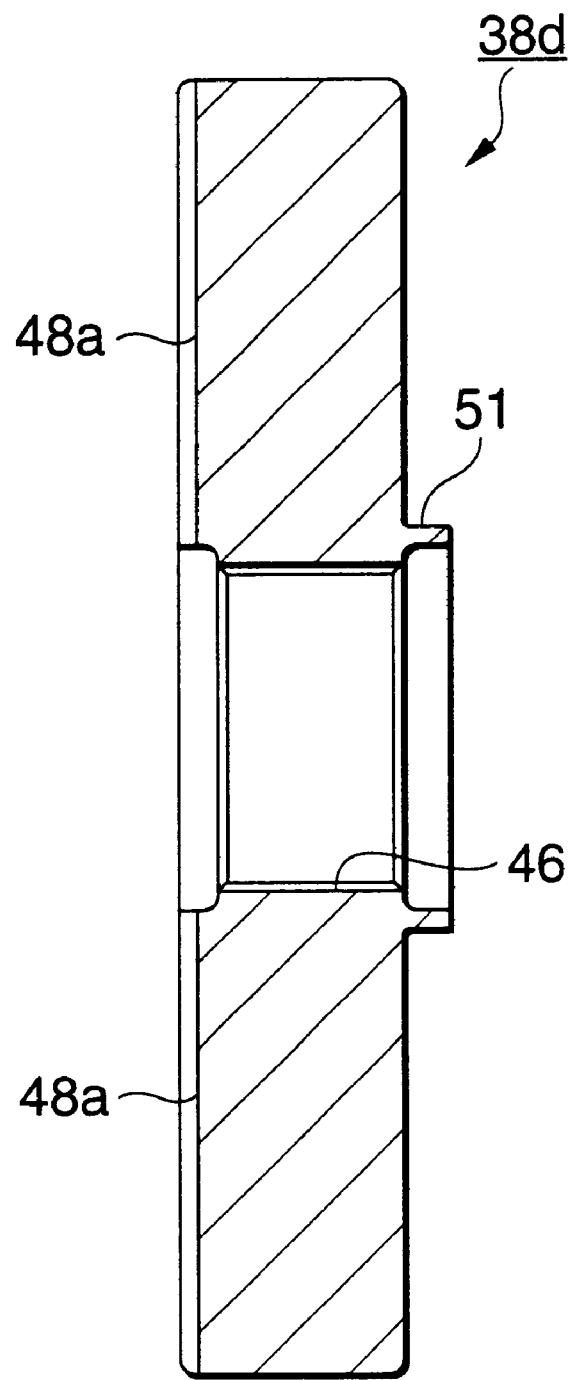
FIG. 6 is an enlarged section view of a loading nut used in the third embodiment.
Figure 7:
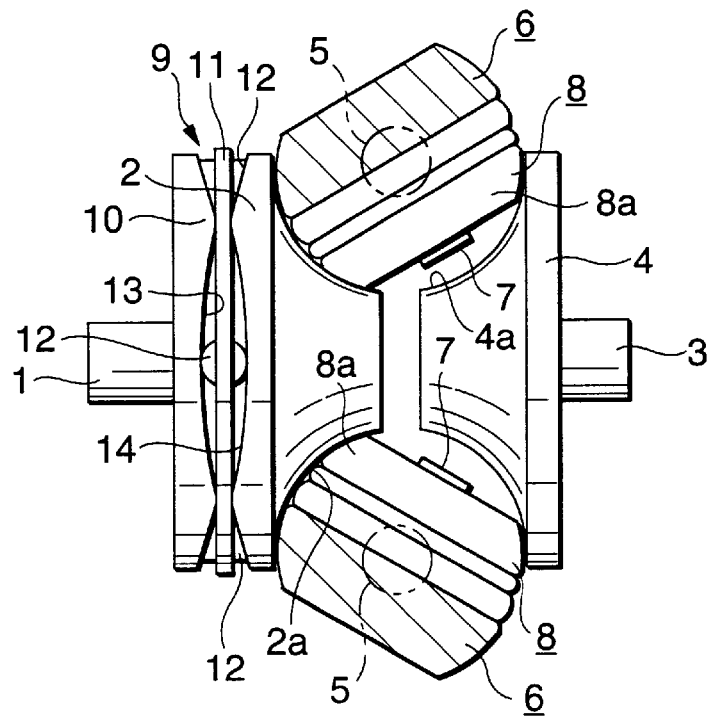
FIG. 7 is a side view of the basic structure of a conventional toroidal-type continuously variable transmission, showing the maximum speed reducing state thereof.
Figure 8:
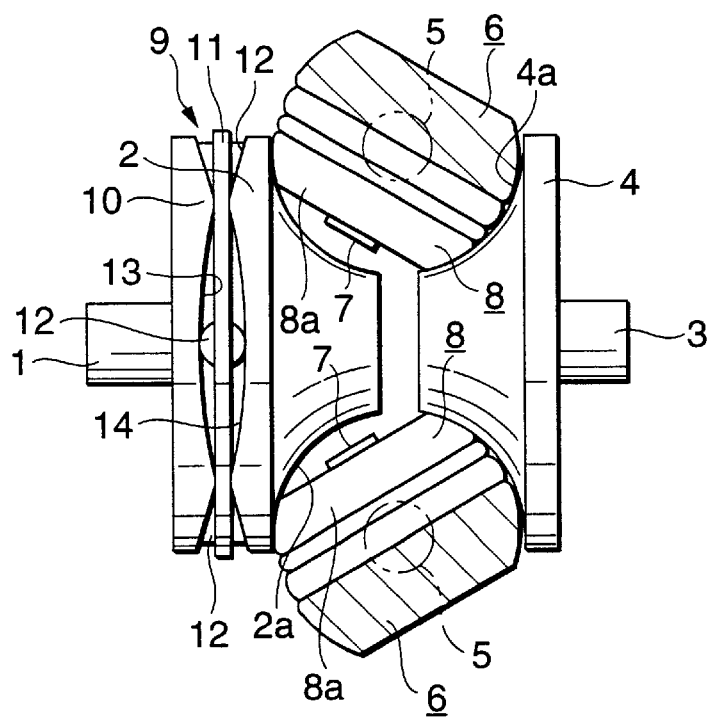
FIG. 8 is a side view of the basic structure of a conventional toroidal-type continuously variable transmission, showing the maximum speed increasing state thereof.

Next, FIGS. 5 and 6 show a third embodiment according to the mode for carrying out the invention. In the present embodiment, a loading nut 38d is disposed on the output side disk 4 side and on the opposite side to a loading cam device 9 with respect to power rollers 8, 8. The structure itself of the loading nut 38d is almost similar to the loading nut 38c employed in the previously described second embodiment.

Since the present invention is structured and operate in the above-mentioned manner, the invention can provide an effect that it can realize a toroidal-type continuously variable transmission which is excellent in durability.

While only certain embodiments of the invention have been specifically described herein, it will apparent that numerous modifications may be made thereto without departing from the spirit and scope of the invention.

What is claimed is:

1. A toroidal continuously variable transmission, comprising:
    a rotary shaft;
    first and second disks respectively rotatably supported on the periphery of said rotary shaft, said first and second disks respectively having inner peripheral surfaces of said first and second disks which are disposed opposed to each other, said inner peripheral surfaces respectively having a cross section formed in an arc-shaped concave surface;
    a plurality of trunnions swingable about pivot shafts disposed at torsional positions with respect to the center axes of said first and second disks;
    a plurality of displacement shafts respectively disposed on said trunnions;
    a plurality of power rollers respectively held between said first and second disks while being rotatably supported on the peripheries of said displacement shafts, each of the peripheries of said power rollers being formed in a spherically-shaped convex surface;
    a loading nut threadedly fixed to a part of said rotary shaft; and,
    a metal elastic member having one side thereof supported by said loading nut to apply an elastic force in a direction where said first and second disks approach each other,
        wherein said loading nut has one end face opposed to said elastic member and includes a fastening deformable portion formed in the other end face thereof,
        the hardness of said one end face opposed to said elastic member is set at HRc45 or higher, and
        the hardness of said fastening deformable portion is set at HRc30 or lower.

2. A toroidal continuously variable transmission according to claim 1, wherein a plurality of recessed grooves for supply of lubricating oil is formed in a portion of said loading nut fitting with said elastic member.

3. A toroidal continuously variable transmission according to claim 1, wherein said loading nut includes a small-diameter portion with the outer surface of which said elastic member can be fitted, and a collar portion against which the axial-direction one end portion of said elastic member can be butted.

4. A toroidal continuously variable transmission according to claim 1, wherein said loading nut is disposed on the outside surface side of said first disk.

5. A toroidal continuously variable transmission according to claim 1, further comprising:

a loading cam device interposed between said rotary shaft and said first disk, for pressing said first disk toward said second disk elastically, wherein said loading nut is disposed on the opposite side to said first disk with respect to said loading cam device.

6. A toroidal continuously variable transmission according to claim 1, further comprising:

a loading cam device interposed between said rotary shaft and said first disk, for pressing said first disk toward said second disk elastically, wherein said loading nut is disposed on said second disk side as well as on the opposite side to said loading cam device with respect to said power rollers.

* * * * *